May 20, 1969
L. GIDGE
3,445,237
PRESHAPED CARTRIDGE FOR, AND METHOD OF PACKAGING, PERCOLATOR GROUND COFFEE
Filed June 28, 1966
Sheet 1 of 2
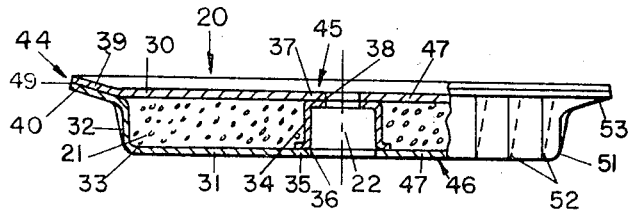
FIG. 1.
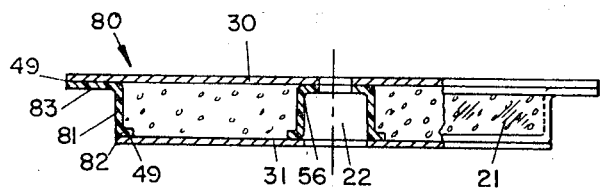
FIG. 2.
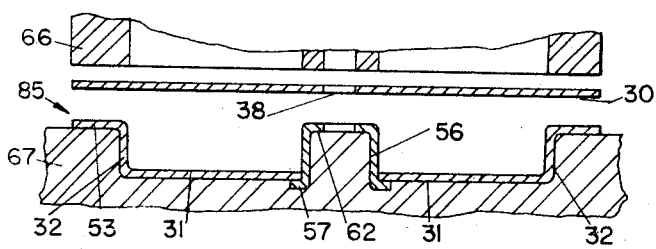
FIG. 3.
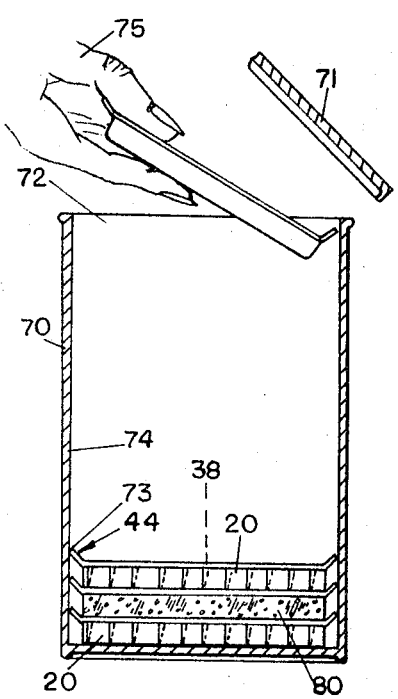
FIG. 4.
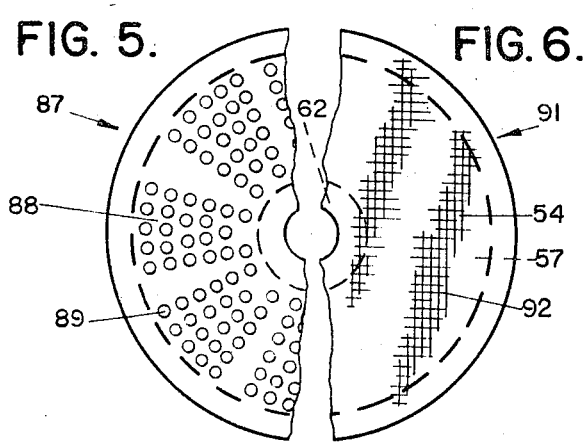
FIG. 5.  FIG. 6.
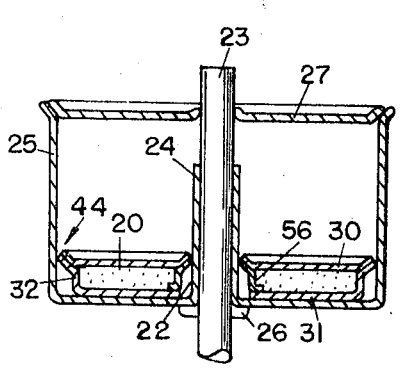
FIG. 8.
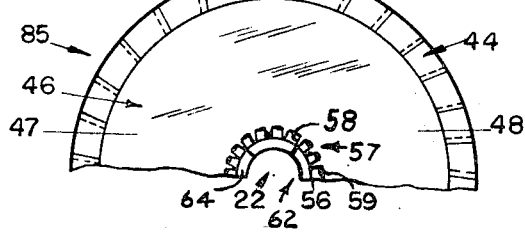
FIG. 7.
INVENTOR.
LESTER GIDGE
BY
Pearson + Pearson
ATTORNEYS

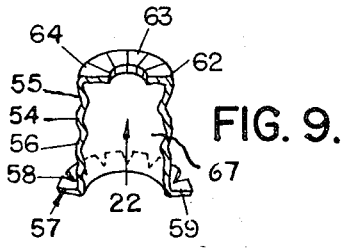
FIG. 9.
FIG. 10.
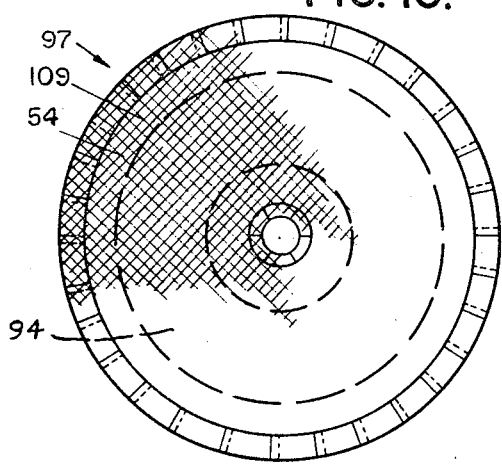
FIG. 11.
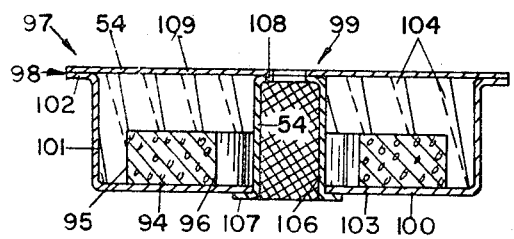
FIG. 12.
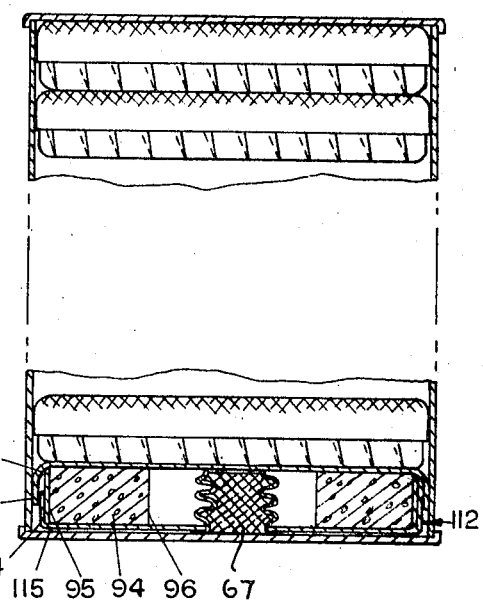
FIG. 13.
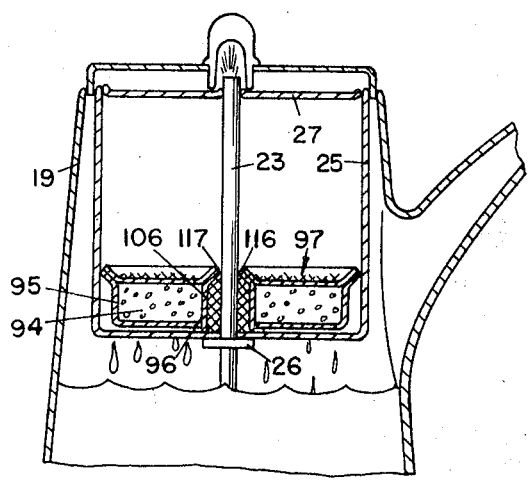
FIG. 14.
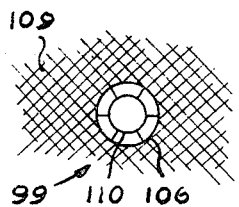
INVENTOR.
LESTER GIDGE
BY
*Pearson + Pearson*
ATTORNEYS

United States Patent Office 3,445,237
Patented May 20, 1969

3,445,237
PRESHAPED CARTRIDGE FOR, AND METHOD OF PACKAGING, PERCOLATOR GROUND COFFEE
Lester Gidge, 61 Linwood St., Nashua, N.H. 03060
Filed June 28, 1966, Ser. No. 561,221
Int. Cl. B65b 29/02; A23f 1/08
U.S. Cl. 99—77.1
15 Claims

ABSTRACT OF THE DISCLOSURE

A disposable cartridge containing a predetermined quantity of percolator ground coffee is pre-formed in flat, annular, hollow, cylindrical shape to fit within, and be supported by, the conventional perforated cup of a percolator. The cartridge is provided with a flanged, cylindrical inner wall to define a central opening around the stem of the percolator and at least the upper and lower walls are formed of porous filter paper to retain the coffee aroma while passing liquid during brewing of the coffee. Upper inner and outer flanges are water impermeable to serve as inclined seals and liquid guides. A flat annular coffee pellet may be used in which case the cartridge is expansible to permit the pellet to expand when wetted.

---

This invention relates to disposable coffee cartridges, each containing a predetermined, measured quantity of coffee, and adapted to be used in the basket of a coffee percolator.

Coffee cartridges of the diffusion type, for use in automatic vending machines, or the like, are well known but they are not annular and therefore will not fit around the stem, or riser, of a percolator.

Annular coffee cartridges for use in a percolator are also known but have not come into general use for reasons of excessive cost of manufacture, ungainly appearance and interference with the making of coffee which is acceptable to the public. For example, in U.S. Patent 1,454,739 to Holland of May 8, 1923 an annular coffee cartridge is disclosed which is formed of discs of fabric of different mesh, sewed together at an exterior central height seam and having a vertical, sleeve of fabric with outwardly directed flanges sewed to the discs. In U.S. Patent 2,460,735 to Carroll of Feb. 1, 1949 a similar coffee bag of fabric is disclosed, except that the fabric discs are not only sewed together at an exterior central height seam, but also at an interior central height seam. Such stitched, limp coffee bags require a relatively costly sewing operation during manufacture. The central height seams present considerable difficulty in filling the bags with a charge of coffee and do not lend themselves to the high speed, automatic production necessary to reduce the cost of the cartridges down to the level of the cost of the coffee uncartridged.

In this invention, the annular coffee cartridges are preshaped into generally hollow cylindrical configuration by preforming the cartridge with an upstanding outer wall and an upstanding inner wall so that a dished, full height annular lower receptacle is formed capable of receiving the entire charge of percolator ground coffee without spillage. The outer wall is provided with an outwardly directed flange and the inner wall is provided with an inwardly directed flange, at the level of the plane of a flat, annular cover member so that the cover member may be adhered to the flanges to seal the filled cartridge, by adhesion and pressure exerted by suitable anvils. The flanges thus not only permit high speed production by heat sealing of the water permeable sheet material of the cartridge, but also serve as external and internal spacers, or cushions, in the can, or in the percolator cup and around the percolator stem, and also as funnels extending above the level of the upper wall of the cartridge to direct water through the cartridge. The cartridge of the invention also includes an inner, upstanding wall which is capable of supporting itself, while a charge of coffee is fed into the dished lower member, but which is yieldable, resilient and easily compressible. This is for the reason that if the inner walls of the cartridges were of rigid material, or simply a single convolution of small diameter of normally nonrigid material, the resistance to compression is such that droppage of a stack of cartridges may cause rupture at the inner peripheral portions.

The annular coffee cartridge of the invention is especially advantageous when used with a compressed, annular, coffee pellet, which swells to about one and one half dry size when wet. With such pellets, each cartridge is provided with a lower, outer flange also, folded partly from material of the outer side wall so that the cartridge fits closely around the dry pellet while cushioning it in the can, but unfolds and expands with the pellet when wet in the percolator.

The principal object of the invention is, therefore, to provide an annular coffee cartridge of water permeable material for use in percolator baskets, wherein the cartridge is preshaped to generally hollow, cylindrical configuration by a preformed upstanding outer wall, the outer wall having an outward extending flange at the top of the cartridge serving as a resilient spacer for fitting baskets and cans of various diameter while also constituting a truncated conical funnel.

Another object of the invention is to provide such a preshaped porous cartridge with a preformed, inner wall of greater diameter than the outside diameter of the stem of a percolator, the inner wall upstanding from the lower wall but being of yieldable, resilient sheet material and having an inward projecting flange at the top of the cartridge for spacer and funneling purposes.

A further object of the invention is to provide a preshaped hollow cylindrical coffee cartridge, having inner and outer side walls sharply angled relative to flat annular top and bottom walls, at least the top and bottom walls being of water permeable, sheet material such as tea bag type filter paper, resin impregnated reinforcing mesh fabric, perforated plastic or the like.

Still another object of the invention is to provide a novel, rugged, low cost coffee cartridge of disposable, water permeable, sheet material capable of being heat and pressure sealed to form a flat, hollow, cylindrical coffee container with water impermeable interior and exterior flange means at the level of the plane of the top thereof for cushioning, adjusting and funneling purposes.

Other objects and advantages of the invention will be apparent from the claims, the description of the drawing and from the drawing in which FIGURE 1 is a side elevation, in half section, of a preshaped coffee cartridge of the invention, with an integral pleated outer side wall.

FIGURE 2 is a view similar to FIGURE 1 showing another embodiment of the cartridge in which the outer side wall is transparent.

FIGURE 3 is a view similar to FIGURE 1 showing a cartridge of the invention, being sealed after filling by the application of pressure and heat on the exterior and interior flanges.

FIGURE 4 is a side elevation, in half section, on a reduced scale, of a typical, sealable coffee can containing a stack of coffee cartridges, one cartridge being lifted for use.

FIGURE 5 is a fragmentary plan view of a cartridge formed of perforated plastic sheet material.

FIGURE 6 is a view similar to FIGURE 5 showing a cartridge formed of resin impregnated meshed fabric.

FIGURE 7 is a fragmentary bottom view showing a cartridge of tea bag type filter paper material.

FIGURE 8 is a side elevation, in half section, on the scale of FIGURE 4, showing a cartridge of the invention within a percolator basket and encircling the percolator riser stem, FIGURE 9 is a slightly enlarged perspective view, in half section, showing the inner wall, or sleeve of yieldable material with its tongued flanges.

FIGURE 10 is a plan view of an embodiment of the invention containing an annular, compressed coffee pellet.

FIGURE 11 is a side elevation in half section of the cartridge shown in FIGURE 1.

FIGURE 12 is a side elevation, partly in half section, showing a stack of pellet type cartridges stacked and cushioned in a typical coffee can.

FIGURE 13 is a fragmentary side elevation, in half section, showing a pellet type cartridge expanded in a percolator basket and FIGURE 14 is an enlarged, fragmentary, plan view of the inner, upper flange of the pellet type cartridge.

As shown in the drawing the percolator coffee cartridge 20, of this invention is of flat, generally hollow cylindrical configuration and is of predetermined dimensions to hold a premeasured quantity, or charge, of percolator ground coffee 21, for example; sufficient to make two cups of coffee. The cartridge 20 is an annulus, or tore, which defines the inner space 22 for encircling the stem, or hot water riser, 23 of a percolator 19, or the corresponding metal stem 24 within a conventional perforated percolator cup, or basket 25 (FIG. 8). 26 designates the conventional stem flange which supports the cup 25 on stem 23 and 27 designates the conventional perforated cover for the percolator cup. The inside diameter of the main body of cartridge 20 is substantially greater than the outside diameter of conventional stems and the outside diameter of the main body of cartridge 20 is substantially less than the inside diameter of conventional baskets, in order to provide a loose fit for easy insertion and withdrawal and for cushioning, spacing and funneling reasons to be explained hereinafter.

Cartridge 20 includes a flat, annular upper wall 30, a flat annular lower wall 31, a preformed, preferably cylindrical, outer, side wall 32 upstanding from the outer peripheral portion 33 of lower wall 31 and a preformed, preferably cylindrical, inner, side wall 34, upstanding from the inner peripheral portion 35 of the lower wall 31. The inner peripheral portion 35 of lower wall 31 defines the central hole 36 of predetermined diameter and the inner peripheral portion 37 of upper wall 30 also defines a central hole 38 of predetermined diameter. The outer peripheral portion of upper wall 30 is designated 39 and the underface of upper wall 30 is designated 40.

External flange means 44 and internal flange means 45 is provided on each cartridge 20, extending laterally in the plane of the upper wall 30. As shown in the embodiment of FIGURE 1, at least the flat annular upper wall 30 and the flat annular lower wall 31, are formed of water permeable sheet material 46 which preferably is a well known tea bag type, filter paper 47 commercially available for diffusion tea bags. Such paper is formed of paper fibres contained in an adhesive carrying liquid vehicle, such as a resin 48 so that the fibrous sheet is water permeable and porous but does not pass the coffee or tea leaves when subjected to hot water at the usual brewing temperatures. It is self-adhering under heat and pressure for sealing. However, any suitable disposable, paper-like sheet material, capable of withstanding brewing temperatures without fracture, may be used and, if not inherently heat sealable, a suitable layer of adhesive 49 can be used to seal the cartridge 20. In FIGURE 1, the upstanding outer side wall 32 is integral with the lower wall 31 and formed of the same material, the wall 32 being bent upwardly at a sharp angle at 51 and pleated as at 52 to form a dished, coffee receptacle, or container, and the pleats 52 being heat sealed in folded position to lend strength and self-support to the wall 32.

The pleated, outer side wall 32 is bent, or folded outwardly to form the annular integral exterior flange 53, which extends outwardly and laterally to register with the underface 40 of the outer peripheral portion 39 of upper wall 30. It should be noted that the flange 53 is pleated, to give additional strength and plies, and that, when it is adhered to the upper wall 30, it receives additional strength and plies, plus the layer of adhesive, or other adhesive means. The resulting external flange means 44 is thus multiple-ply and substantially water impermeable, but also flexible and resilient. It is preferably about one quarter of an inch in width, and is preferably normally horizontal. However, as shown, it may also be preformed with a slight upward incline if desired.

The inner side wall 34 may also be an adhesively seamed, single convolution, or multiple convolutions, of the paper-like filter material 47, but it has been found that even a single convolution of such material due to the small diameter of the sleeve, may tend to be so resistant to compression that it may fracture other cartridges when stacked as in FIGURE 4 and in the event of an impact when dropped. The inner wall 34 is therefore preferably formed of a commerically available, non-woven, meshed sheet material 54 having a heat seal binder 55 impregnated therein to substantially close the meshes thereof. The material will pass water and air but will not pass coffee grains or fines and has been found to stand upright, as a single convolution, seamed, sleeve 56 shown in FIGURES 3 and 9 but to offer negligible resistance to compression and to yield and resiliently flex under droppage with no danger of fracturing other cartridges stacked in a coffee can. It has also been found that creped paper material, because of its inherent bendability, or pliability, is satisfactory for the small diameter inner side wall.

The inner side wall 34 formed by a sleeve 56 of meshed material 54 includes a lower, outwardly extending flange 57, split by radial slits 58 to form tongues 59, the flange 57 being adhered, or heat sealed to the upper face 60 of the inner peripheral portion 35 of lower wall 31. Inner wall 34 also includes the inwardly extending flange 62, split by radial slits 63 to form tongues 64, the flange 62 registering with the under face 40 of the inner peripheral portion 37 of upper wall 30 (FIG. 3).

As best shown in FIGURE 3, it will be seen that the lower wall 31, outer side wall 32 and inner side wall 34, with the flanges 57 and 62 extending laterally therefrom, forms a dished, annular, receptacle adapted to receive a full charge of coffee 21 without spillage. It will also be seen that the flat, annular upper wall 30, may be laid over the same, when full, and by means of the upper and lower hot plates, or anvils, 66 and 67 the flanges may be heat sealed under pressure to the upper wall, to create a sealed container, or cartridge, 20.

As shown, in FIGURE 4, a plurality of pre-shaped disposable coffee cartridges 20 may be shipped and stored in a conventional coffee can 70, which is normally vacuum sealed and provided with a conventional plastic cover 71, for sealing the opening 72, after the can has been opened for use. The flat, hollow cylindrical configuration of the cartridges permits neat and attractive stacking and the external flange means 44, with its reinforced plies, flexibility and resiliency permits the cartridges to fit cans of various diameters, within a predetermined range while serving as a support, cushion and spacer to prevent undue movement of the cartridges in transit.

The normally horizontal flange means 44 is shown upwardly inclined, to form a truncated cone in FIGURE 4, with the edge rim 73 in frictional engagement with the inner wall 74 of the can 70. The cartridges may be easily removed by the finger of a user 75, by insertion into the opening 38 of each cartridge 20, the meshed frictional surface 76 of the sleeve 56 facilitating withdrawal. A cartridge 20 is shown being lifted out of the can to illustrate that the cartridge, because of its preformed walls, pleats and angular interior corners, maintains its shape even though it is supported only on one edge portion.

As shown in FIGURE 8, one or more cartridges 20 are placed within the perforated cup 25, with the normally horizontal flange means 44 bent upwardly into a truncated cone to form a spacer which adjusts itself to various diameters of percolator cups. Similarly the normally horizontal flange means 45, is bent upwardly into a truncated cone to form a spacer which adjusts itself to various outer diameters of percolator stems, or basket sleeves. Because of the multiple ply, heat set, adhesive, pleated or overlapping tongued construction of the flange means 44 and 45, hot water flowing downwardly from the stem 24 into cup 25 is directed and guided by the funnel effect of means 44, and the baffle effect of means 45, to pass through the water permeable upper walls 30 and lower walls 31 of the cartridges 20.

As shown in FIGURE 2 a cartridge 80, similar in all respects to cartridge 20, may be provided, but which includes a side wall 81, lower inwardly directed flange 82 and upper outwardly directed flange 83, all formed of thin transparent plastic sheet material, such as polyethylene. The lower flange 82 is adhered to the water permeable lower wall 31 by adhesive 49, and the upper flange 83 is adhered to upper wall 30 by adhesive 49, the plastic flange 83 being water-impermeable but resilient and flexible to accomplish the spacer, cushion and funnel objectives. The coffee 21 is visible through the transparent plastic side wall 81, thus tending to visually appeal to the user while the fragrance and aroma of the coffee is always present with all embodiments of cartridge 20 due to the water, and air permeability of the upper and lower walls 30 and 31.

In FIGURES 3 and 7, a cartridge 85 is shown which is identical with cartridge 20, except that the tongued flange 57 is adhered and secured to the lower face of bottom wall 31, rather than to the upper face thereof.

In FIGURE 5, a cartridge 87 is shown which is identical in configuration with the cartridge 20, but made from water impermeable sheet material, having a predetermined pattern 88 of minute perforations 89 in the upper and lower walls thereof. The water impermeable material can be metal foil, transparent sheet plastic or the like, the latter providing full visibility of the coffee contents. The perforations may be mechanically secured by punching the top and bottom sheets to obtain the optimum flow-through, for example holes approximately .006–.007 diameter. The perforating needles may be heated to 250° F. in order to set the resin, in a resin containing sheet material and thereby achieve a perfect, non-closing hole.

In FIGURE 6 a cartridge 91 is shown which is also identical in configuration with the cartridge 20, but made entirely from the meshed material 54 preferred for use in the inner wall 34, as exemplified by sleeve 46. This material is inherently porous, because of its open mesh 92 and is commerically available in mesh of various dimensions, so that a fine mesh will pass hot water but will not pass percolator ground coffee. It contains a heat seal binder and thus can be heat sealed at the flanges.

The tea bag type paper preferred for use in this invention is formed of "Vinyarn," a synthetic resin fiber composed of a polyvinyl compound and is thermoplastic. It has long been approved by the Food and Drug Administration for use in tea bags.

Another embodiment of the invention is illustrated in FIGURES 10 to 14, wherein a relatively hard, annular pellet 94 of coffee is used rather than loose coffee. Pellet 94 may, for example, contain enough coffee for four cups, compressed and compacted into a flat, annular, solid cylinder to conserve shipping space, but expands to one and one half times its dry size when wet. The outer peripheral edge 95 of pellet 94 is much smaller in diameter than the inside diameter of a conventional percolator basket, or cup 25, and the inner peripheral edge of pellet 94 is much larger in diameter than the outside diameter of a conventional stem 24, in order to fit a wide range of sizes. A tablet having dimensions of three inches outside diameter, one and one quarter inches inside diameter and .437 inch thickness is illustrated.

In FIGURES 10, 11, 12 and 14, the dry tablet 94 is shown contained within a cartridge 97, similar to cartridge 20 in having an outer, upper peripheral flange 98 and an inner, upper, peripheral flange 99. The receptacle portion of cartridge 94, including the flat, annular lower wall 100, upstanding outer side wall 101 and outwardly directed upper flange 102, are all formed by one piece of tea bag type filter paper material 103, there being about twenty-four pleats 104 in wall 101 and flange 102. The inner side wall, or core, 106 is formed of meshed sheet material 54, with an integral, lower, outwardly directed flange 107 heat sealed to the lower wall 100 and an integral, upper, inwardly directed flange 108 heat sealed to the flat annular upper wall 109 to form inner, upper flange 99. The outer portion of upper wall 109 overlies, and is heat sealed to the flange 102 to form the upper outer flange 98. As shown in FIGURE 14 the inner flange 99 is slit, for example with six slits extending from the one quarter inch aperture 110 outwardly to define a circle of about three eighths diameter, the diameter of core 106 being about one half inch. The upper wall 109 is of the meshed material 54 which blends with the binder in the material 103 when heat sealed thereto.

It should be noted that the cartridge of FIGURE 11 is nearly one inch in height, but that the core 106 is yieldable and compressible in the manner of an accordion, or bellows, when the lower outer flange means 112 is formed. As shown in FIGURE 12, for packing in a can, the outer side wall 101 is folded at 113, 114 and 115 to form the multi-ply upfolded flange 112 on the periphery of the cartridge, while the upper, outer flange is folded downwardly to overlie the lower flange 112. A multiplicity of layers of tea bag paper and meshed material thus cushion the pellet from the wall of the can and prevent fracture of the pellet during shipment. Twelve coffee cartridges in the can are the equivalent of loose coffee for forty-eight cups, but take up much less space than loose coffee.

In FIGURE 13 the cartridge 97 and pellet 94 are shown expanded, by the effect of the hot water, with the upper outer flange, or lip 98 serving as a combined spacer, cushion and funnel. The inner, upper flange is also bent upwardly with the inner tongues 116, formed by the slits 117, serving as a combined cushion, spacer and seal around the stem 23. The lower outer flange means 112 unfolds and disappears as the pellet expands.

What is claimed is:
1. A disposable coffee cartridge, preshaped to fit within, and be supported by, the perforated cup of a coffee precolator, said cartridge comprising:
   a predetermined quantity of percolator coffee enclosed in a substantially flat, annular, container of water-permeable, synthetic resin fibre sheet material, of generally hollow cylindrical configuration, loosely fitting within said cup and loosely fitting around the stem of said percolator, said container including:
   upper and lower annular walls having their outer peripheries connected by an upstanding outer side wall and their inner peripheries connected by an upstanding inner side wall, said inner side wall defining a central hole, and
   outwardly directed, resilient, flexible, flange means extending laterally from the outer upper periphery of said container to engage the inside wall of said cup for serving as a combined self-adjustable spacer within said cup and said flange means being water impermeable for serving as a funnel directing water in said cup through said container.

2. A disposable coffee cartridge as specified in claim 1 plus:

inwardly directed, resilient, flexible, flange means extending laterally from the inner, upper periphery of said container to engage the stem of said percolator, said means being water impermeable, for serving as a combined self-adjustable spacer and seal around said stem and as a truncated, conical baffle directing water in said cup through said container.

3. In combination with the perforated cup of a coffee percolator, a preshaped, disposable cartridge fitting within, and supported by said cup, said cartridge comprising:

a predetermined quantity of percolator ground coffee enclosed in a substantially flat container of generally hollow cylindrical configuration, having upper and lower annular walls and a preformed outer side wall upstanding from the outer periphery of said lower wall;

at least said upper and lower walls being formed of water-permeable, porous, filter paper sheet material; resilient, flexible, water-impermeable exterior flange means extending outwardly and laterally from said outer side wall and secured to the under face of the outer periphery of said upper wall for serving as a combined self adjustable spacer within said cup and as a funnel directing hot water through said upper and lower walls, and a preformed inner side wall of limp, sheet material, said side wall having resilient, flexible water impermeable interior flange means extending inwardly and laterally from the top thereof and secured to the under face of the inner periphery of said upper wall, said inner flange means encircling the stem of said percolator and the bottom of said inner side wall being secured to the inner periphery of said lower wall.

4. In combination with the perforated cup of a coffee percolator, a preshaped, disposable coffee cartridge, said cartridge comprising:

a predetermined quantity of percolator ground coffee;
a substantially flat, annular container of generally hollow cylindrical configuration enclosing said coffee and fitting within said cup, said container having:

substantially flat, planar, annular upper and lower walls of water permeable, synthetic resin fibre sheet material;
said lower wall having a preformed outer side wall secured thereto and upstanding therefrom, terminating in an exterior flange extending laterally and outwardly from the plane of said upper wall to underlie the outer peripheral portion thereof;
adhesive means sealing said flange to the said outer peripheral portion of said upper wall to form an adhesive reenforced, two ply flange adapted to serve as a funnel and resilient spacer within said cup;
and preformed, flanged, inner, side wall means connecting, and secured to, the inner peripheral portions of said upper and lower walls, said means being formed from a single thickness, separate piece of limp, sheet material.

5. A disposable coffee cartridge as specified in claim 4 wherein:

said flanged inner side wall means of limp sheet material comprises:
a resilient, yieldable, compressible sleeve having an outwardly extending flange at the bottom thereof and an inwardly extending flange at the top thereof:
said flanges being in planes normal to the axis of said sleeve, being radially slit to form a plurality of tongues and said tongues are adhered to the inner peripheries of said upper and lower walls.

6. A disposable coffee cartridge as specified in claim 4 wherein:

said lower wall, said preformed, upstanding outer side wall and said laterally extending exterior flange are all integrally formed of water permeable filter paper material, said side wall and exterior flange being pleated and the pleats of said flange being adhered to the under face of the outer peripheral portion of said upper wall by said adhesive means to seal the same while forming a water impermeable, multiple ply exterior flange.

7. A disposable coffee cartridge as specified in claim 4 wherein:

said annular upper and lower walls are each identical flat annular discs of porous synthetic resin fibre material, and
said outer side wall is formed of a ring of transparent, thin plastic sheet material having an inturned lower flanged adhered to said lower wall and an out turned upper flange adhered to said upper wall.

8. A disposable coffee cartridge as specified in claim 4 wherein:

said flanged inner side wall means includes an upstanding interior wall of yieldable, compressible, non-self supporting, flexible meshed flabric having integral upper and lower flanges each adhered to one of said upper and lower walls, said interior wall offering negligible resistance to vertical compression and having a friction inner face for non-slip engagement with the finger of a user.

9. A disposable coffee cartridge as specified in claim 4 wherein:

said laterally extending exterior flange is preformed with a predetermined outer diameter when in the plane of said upper wall greater than the inside diameter of said cup to serve as a resilient cushion when inserted in a precolator cup of such lesser diameter.

10. In combination with the perforated cup of a coffee percolator, a disposable coffee cartridge, said cartridge comprising:

a premeasured quantity of percolator ground coffee;
a substantially flat, annular container preshaped in generally hollow cylindrical configuration, said container enclosing said coffee and fitting within said cup and around the stem of said percolator, said container having:

a substantially flat, annular bottom wall, of synthetic resin fibre filter paper preformed with an upstanding, cylindrical, outer side wall terminating in an outwardly directed, lateral flange extending parallel to said bottom wall at the level of the top of said cartridge;
an upstanding, cylindrical, inner side wall, secured to the inner periphery of said annular bottom wall, said inner wall terminating in an inwardly directed, lateral flange extending parallel to said bottom wall at the level of the top of said cartridge;
and a flat, annular upper wall of said synthetic resin fibre filter paper, adhered around its outer periphery to said outer flange and adhered around its inner periphery to said inner flange.

11. A disposable coffee cartridge for use in the perforated cup of a coffee percolator, said cartridge comprising:

a premeasured quantity of percolator ground coffee in the form of a flat, annular, dry pellet of compressed coffee, said pellet having a normal outer diameter, inner diameter and thickness of predetermined dimensions to loosely fit in said cup and loosely fit around the stem of said percolators, and
a substantially flat, annular container loosely enclosing said pellet with excess material sufficient to permit expansion thereof, said container having:
substantially flat, annular, upper and lower walls and upstanding inner and outer side walls defining a preshaped hollow cylinder; at least said upper and lower walls being of water permeable sheet material and said inner wall being of limp material collapsible into bellows configuration;
integral flange means extending laterally outside the outer periphery and inside the inner periphery of said container, at the level of said upper wall for cushioning spacer, funnel or sealing purposes, and
an upfolded flange means formed in the excess material of said container for compacting said container into a close fit around said pellet, for shipment and storage thereof when dry, but permitting said pellet to expand when wet.

12. A coffee cartridge as specified in claim 11 wherein:
said lower wall and upstanding outer wall are of synthetic resin fibre filter paper and said outer wall is pleated
and said upper wall and inner wall are formed of meshed sheet material heat sealable to said filter paper.

13. The method of packaging percolator ground coffee by means of water permeable sheet material, said method comprising the steps of:
preforming a flat annular, dished container of said water permeable sheet material with a flat lower wall having a central opening, an upstanding pleated outer side wall and an outwardly extending flange at the outer upper periphery of said container, said container being preformed to loosely lie within a conventional percolator cup, and
preforming a hollow cylindrical, inner side wall of limp flexible sheet material with an inwardly extending flange at the upper periphery and an outwardly extending flange at the lower periphery of said inner side wall;
sealing the said lower peripheral flange of said inner side wall to said flat lower opening around said central opening;
then depositing a predetermined quantity of percolator ground coffee in said container, applying a flat annular cover of said water permeable material to overlie said outer upper flanges and inner, upper flanges and heat sealing said cover to said flanges to form a sealed cartridge,
whereby said cartridge may be shipped in a coffee can with said outer flange turned down to serve as a cushion and may be placed in a percolator cup with both said flanges turned up to serve as a funnel and seal therein.

14. A method as specified in claim 13 which includes the steps of:
preforming said predetermined quantity of coffee as a compressed, flat, annular pellet of predetermined dimensions
preforming said container with predetermined dimensions greater in height and outside diameter, and less in inside diameter than said pellet;
and folding the inner wall of said container into bellows configuration, folding the lower outer portion of said container into an upwardly directed unfoldable flange and folding said outwardly extending upper flange downwardly over said unfoldable flange to cushion and closely fit around said pellet during shipment in a can.

15. A method as specified in claim 13 plus the step of:
pleating the sheet material in said outer side wall and in said outer, upper flange during the preforming of said container to reinforce the same.

References Cited

UNITED STATES PATENTS

| | | | |
|---|---|---|---|
| 2,531,594 | 11/1950 | Abrahams | 99—77.1 |
| 3,083,100 | 3/1963 | Baran | 99—77.1 |
| 3,250,398 | 5/1966 | Adiletta | 99—77.1 X |
| 3,264,973 | 8/1966 | Tavera | 99—295 |

A. LOUIS MONACELL, *Primary Examiner.*

S. B. DAVIS, *Assistant Examiner.*

U. S. Cl. X.R.

99—295; 206—.5